(No Model.) 4 Sheets—Sheet 1.
J. KAMES.
COMPRESSED AIR MOTOR FOR PROPELLING WHEELED VEHICLES.
No. 491,892. Patented Feb. 14, 1893.
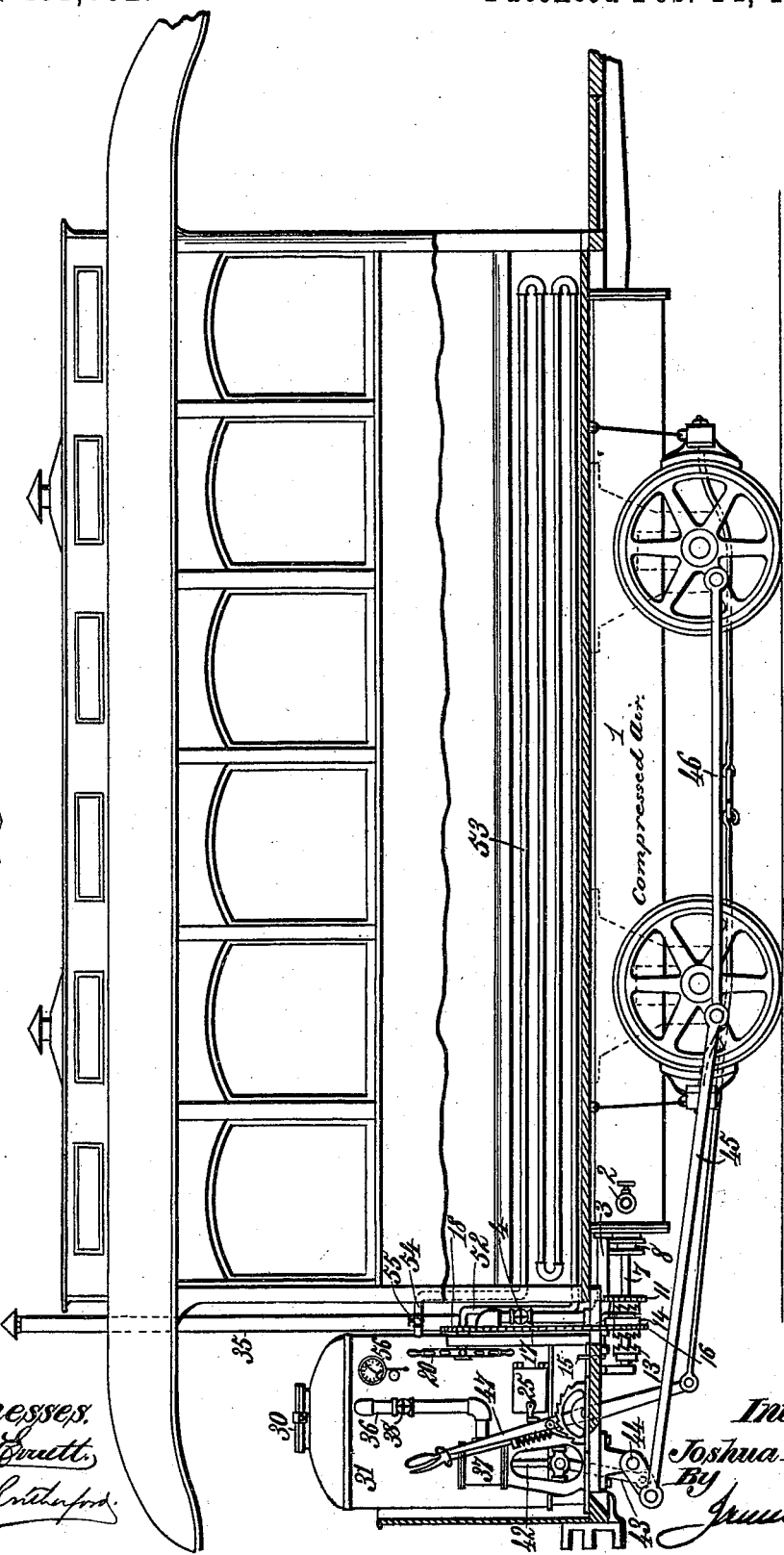
Witnesses
Inventor
Joshua Kames,
By James L. Norris,
Atty

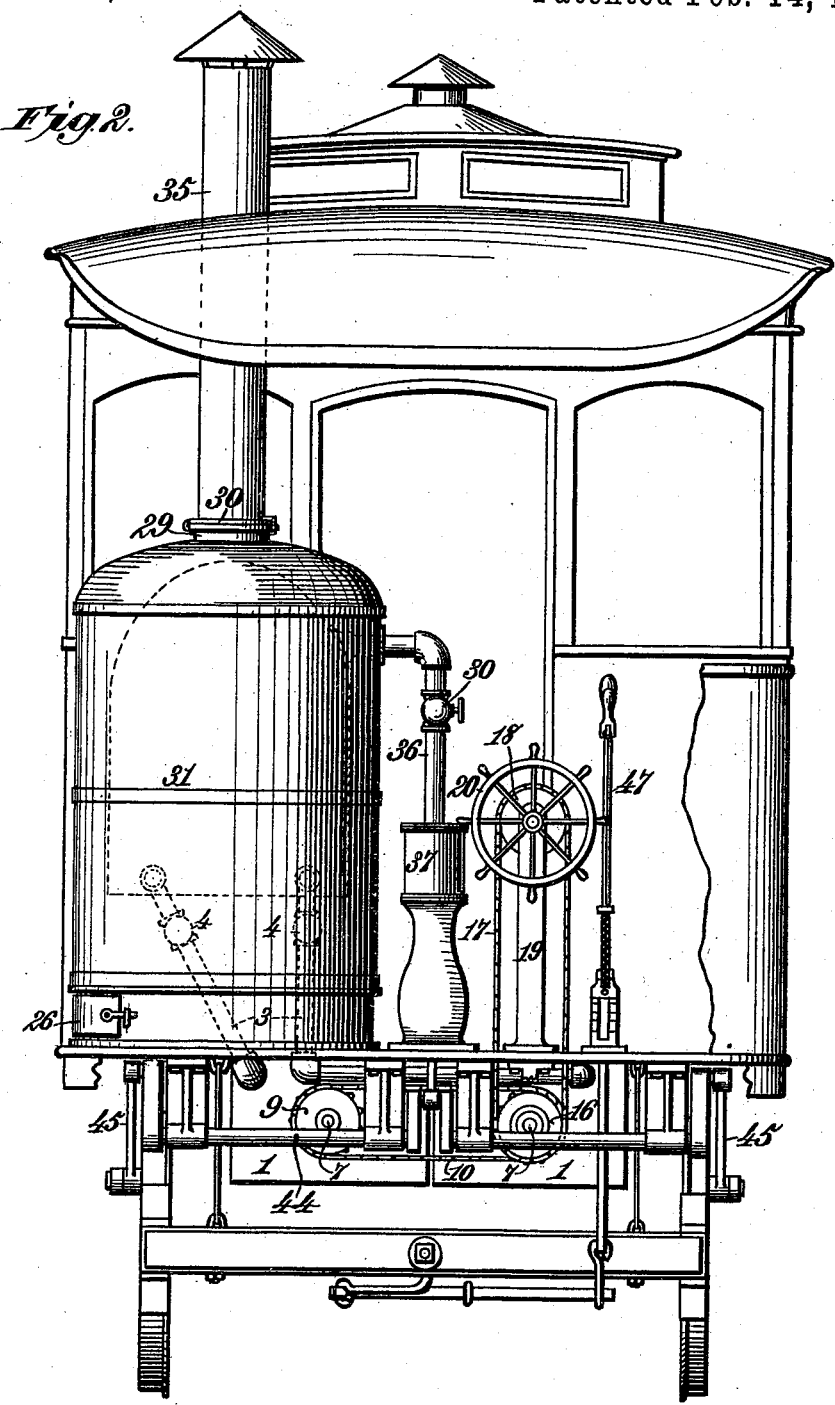

(No Model.) 4 Sheets—Sheet 3.
J. KAMES.
COMPRESSED AIR MOTOR FOR PROPELLING WHEELED VEHICLES.
No. 491,892. Patented Feb. 14, 1893.
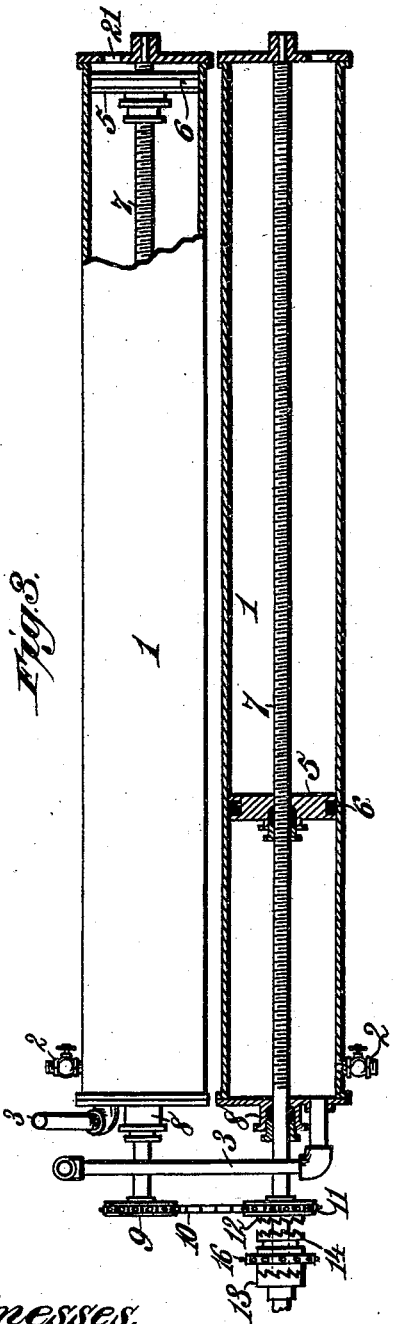
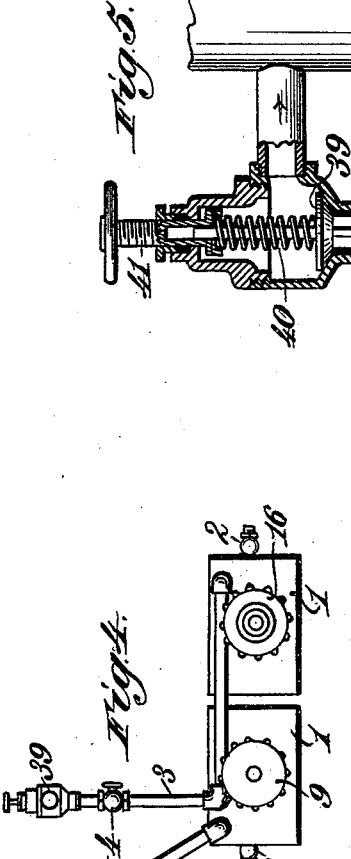
Witnesses.
Inventor:
Joshua Kames.
By
Atty.

(No Model.) 4 Sheets—Sheet 4.
J. KAMES.
COMPRESSED AIR MOTOR FOR PROPELLING WHEELED VEHICLES.
No. 491,892. Patented Feb. 14, 1893.
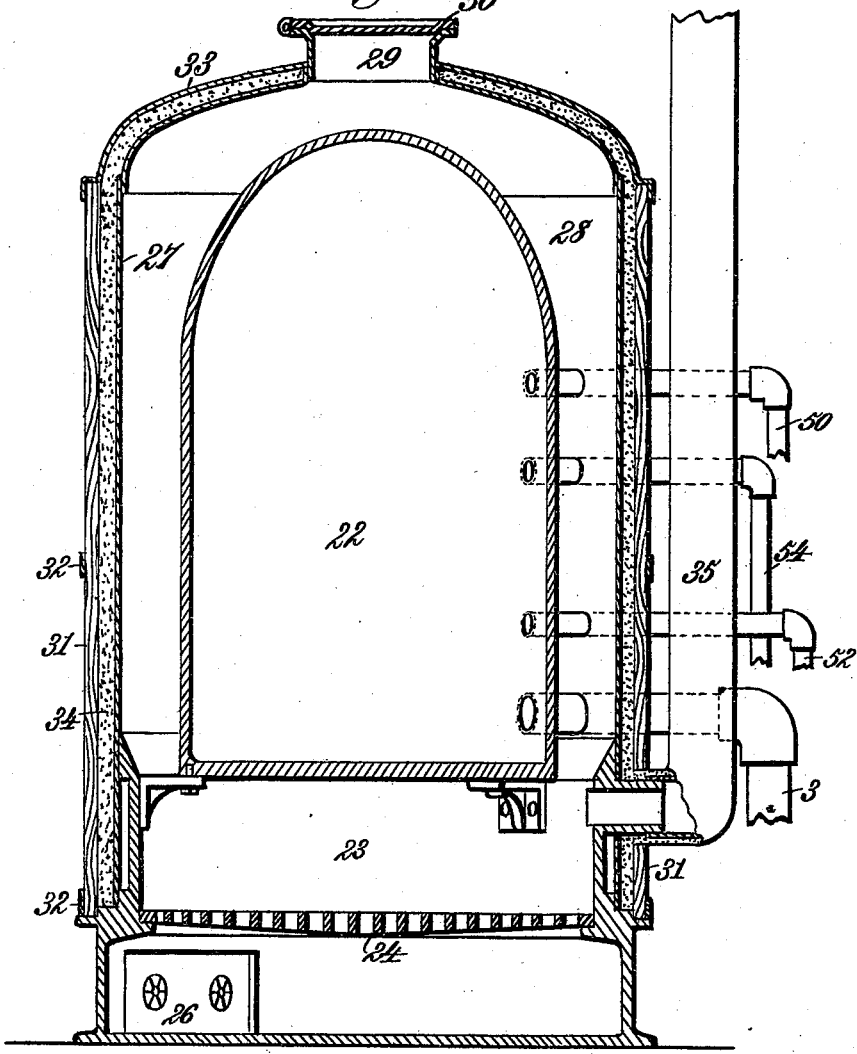
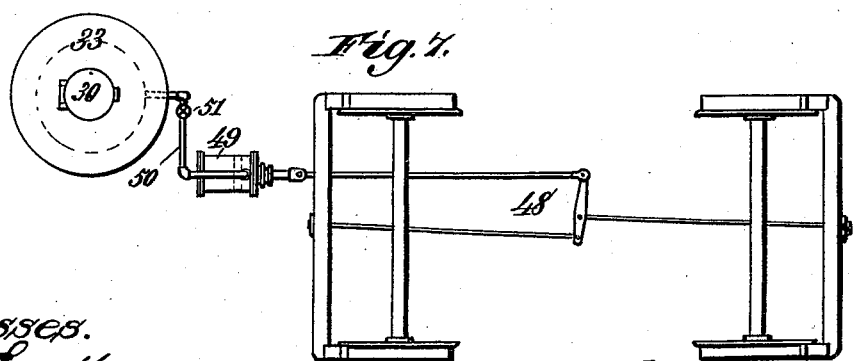
Witnesses.
Inventor.
Joshua Kames.
By James L. Norris, Atty.

UNITED STATES PATENT OFFICE.

JOSHUA KAMES, OF PHILADELPHIA, PENNSYLVANIA, ASSIGNOR TO THE ATMOSPHERIC PROPULSION COMPANY, OF NEW JERSEY.

COMPRESSED-AIR MOTOR FOR PROPELLING WHEELED VEHICLES.

SPECIFICATION forming part of Letters Patent No. 491,892, dated February 14, 1893.

Application filed June 9, 1892. Serial No. 436,121. (No model.)

*To all whom it may concern:*

Be it known that I, JOSHUA KAMES, a citizen of the United States, residing at Philadelphia, in the county of Philadelphia and State of Pennsylvania, have invented new and useful Improvements in Compressed-Air Motors for Propelling Wheeled Vehicles and for other Purposes, of which the following is a specification.

My invention relates to an improved compressed air motor for propelling wheeled vehicles, and it consists in the peculiarities of construction and novel combinations of devices as hereinafter described and claimed.

In the annexed drawings illustrating the invention—Figure 1 is a sectional side elevation of a street car provided with my improved motor. Fig. 2 is an end elevation of the same with a portion of the car broken away. Fig. 3 is a partly sectional plan of the compressed-air reservoirs and the mechanism for maintaining a substantially uniform pressure in either of said reservoirs by diminishing the air space from time to time as the air is periodically withdrawn therefrom for use in the compressed-air engine. Fig. 4 is an end elevation of the compressed-air reservoirs, showing the valved inlets and exits and a portion of the mechanism for diminishing the air space to maintain a practically uniform pressure when a portion of the compressed-air is withdrawn. Fig. 5 represents a portion of the air expanding chamber and a sectional elevation of an automatic pressure regulating valve or governor located in or upon a pipe through which said chamber receives compressed-air from one of the compressed-air reservoirs. Fig. 6 represents a sectional elevation of an air expanding chamber located above a suitable heater and surrounded by a fuel magazine inclosed by a non-conducting casing. Fig. 7 is a plan of a compressed-air brake mechanism connected with and supplied from the air expanding chamber.

Referring first to Figs. 1, 2, 3 and 4, the numeral 1 designates compressed-air reservoirs of any convenient form and size and constructed in any well known or approved manner. Two of these compressed air reservoirs are preferably supported in a convenient manner beneath a car body as shown in Figs. 1 and 2 but it will be apparent that said reservoirs may be carried in or upon the upper part of the car or beneath the car seats or elsewhere, as preferred.

Each compressed-air reservoir is provided at a suitable point with a valved air inlet 2, Figs. 3 and 4, constructed for temporary attachment of a pipe or hose through which the said reservoir can be supplied with compressed-air when required. To each of these compressed air reservoirs 1 is also connected an exit pipe 3 having a hand valve 4 by which the flow of compressed-air from either reservoir can be controlled or cut off.

It is my purpose to have each compressed-air reservoir of sufficient capacity to contain all the compressed air that will be required as a motive power during one trip of the car over a route extending, say, from five to eight miles in one direction. The compressed air can be taken from one reservoir during the out trip, the other reservoir being meanwhile cut out by closing the valve 4 in its exit pipe, and on the return trip the empty or nearly emptied reservoir will be cut out while the other one is employed as a source of power.

In each compressed air reservoir 1 is arranged, transversely, an adjustable head or partition 5, Fig. 3, having in its periphery a suitable packing 6 and centrally mounted on a screw shaft 7 that is supported in bearings provided at the opposite ends of the reservoir. One end of each screw shaft 7 projects through a stuffing-box 8 with which one end of each reservoir is provided. On the projecting end of one of these screw shafts is a fast sprocket wheel 9 which is connected by a sprocket chain 10 with a loose sprocket wheel 11 on the other screw shaft.

Attached to or formed on the loose sprocket wheel 11 is the loose jaw 12 of a clutch mechanism which also comprises a fixed jaw 13 on the end of the screw shaft and an intermediate adjustable driving jaw 14 that can be made to slide on said screw shaft between said loose jaw 12 and fixed jaw 13 to engage with either and thus enable either screw shaft 7 to be rotated. The driving clutch jaw 14 can be disengaged from either jaw 12 or 13 and at the same time engaged with the other by means of a clutch lever 15 projecting through the car platform, within reach of the operator's foot, as shown in Fig. 1.

To the driving clutch jaw 14 is secured a sprocket wheel 16 for attachment of a sprocket chain 17, Figs. 1 and 2, that connects with a sprocket wheel 18 which is journaled to the top of a standard 19 on the car platform. This sprocket wheel 18 is connected with a hand wheel 20 through which the driving clutch 14 may be rotated from time to time and thus actuate either screw shaft 7 according to the position of said clutch with relation to the jaws 12 and 13 as controlled by the clutch lever 15 hereinbefore described. By means of this mechanism for actuating either screw shaft 7 the movable head or partition 5 in either compressed-air reservoir can be adjusted periodically to gradually diminish the compressed-air space and thus maintain a constant and uniform pressure in the reservoir notwithstanding the periodical withdrawal of compressed-air for supplying the motor.

In the end of each compressed-air reservoir, at the rear of its adjustable head or partition 5 is a vent opening 21 that communicates with the atmosphere to prevent the formation of a vacuum and permit the passage of atmospheric air to and from that end of the compressed-air reservoir according to the adjustment given to the movable head or partition.

The compressed-air is taken from either compressed-air reservoir 1, through its valved pipe 3, to an expanding chamber 22 in which the compressed-air is heated and expanded before being delivered to the compressed-air engine or cylinder. This expanding chamber 22 is preferably dome shaped and supported above or in the upper part of a fire pot or heater 23 arranged on the car platform as shown in Fig. 6. This heater may be of any convenient form or character and may be provided with a grate 24, a fire door 25, Fig. 1, above the grate and an ash pit door 26, Figs. 2 and 6, that may have suitable dampers.

Surrounding the upper part of the heater 23 and extended above the same and around the expanding chamber 22 is a dome shaped metal shell 27 inclosing an annular space that serves as a fuel magazine 28 through which the fuel is gradually fed into the fire-pot 23, as required.

At the top of the fuel magazine is a hopper 29 which may be provided with a hinged lid 30, as shown.

The shell 27 of the fuel magazine 28 is surrounded by an outer casing 31 of wood or other suitable material which may be secured by bands 32 at convenient intervals. The top of this casing 31 may be closed by a concavo-convex metal cover 33 secured in any convenient manner.

Between the magazine shell 27 and its casing 31 is placed a filling 34 of asbestos or other non-conducting material.

A combustion relief pipe 35, for the escape of gases, leads from one side of the heater 23 and is extended above the car roof.

From the expanding chamber 22 the air is taken through a pipe 36 to an air engine 37 Figs 1 and 2, of any suitable or well known construction. This pipe 36 is provided with a throttle valve 38 through which the supply of air delivered to the engine can be controlled at will.

In order to provide for automatically controlling the pressure of compressed-air in the expanding chamber 22 an automatic pressure regulating valve or governor 39, Fig. 5, may be placed in the pipe connection 3 that leads from the compressed air reservoir to said expanding chamber. As shown, this valve 39 may be normally seated by a spring 40 having its pressure adjusted to the required degree by a screw-bearing 41 but any other form of governor or pressure regulating valve may be employed that is capable of automatically controlling the passage of air from the reservoir 1 to the expanding chamber 22 in such a manner as to maintain the desired pressure in said chamber.

To the piston-rod 42 of the air engine is attached a pitman 43 that connects with a crank shaft 44 to which are attached the driving rods 45 that connect with cranks on front and rear axles or with wrist-pins on the adjacent forward car wheels from which power may be transmitted by connecting rods 46 to the rear car wheels.

On the car platform, as shown in Figs. 1 and 2, may be arranged a brake lever 47 connected with any suitable brake mechanism arranged to be operated by hand. As shown in Fig. 7 the brake mechanism 48 may be connected with a piston in a cylinder 49 that is supplied with compressed-air through a pipe 50 leading from the expanding chamber. By means of a valve 51 in this pipe 50 the engineer or car driver can cause a supply of compressed air to be delivered to the cylinder 49 whenever it is desired to put on the brakes.

For the purpose of warming the car, when required, heated air can be taken from the expanding chamber 22 through a pipe 52 connecting with a suitable radiator 53, Fig. 1, arranged beneath the car seats or in any other suitable position within the car the said heated air, after circulating through the radiator, being returned to the expanding chamber through a pipe 54, as shown in Figs. 1 and 6. Either or both of these pipes 52 and 54 may be provided with a hand valve 55 by which the heating of the car can be regulated.

The expanding chamber 22 is preferably located on the car platform and may be provided with a pressure-gage 56, Fig. 1, as a guide for the engineer or driver in manipulating the valve 4 in the pipe 3 through which said expanding chamber is supplied from one of the compressed air reservoirs.

What I claim as my invention, is:—

1. The combination of two compressed-air reservoirs, an adjustable partition arranged in each of said reservoirs, screw shafts for adjusting said partitions, each of said screw shafts being arranged to project from one end of a reservoir, gearing that connects the projecting ends of said shafts, driving devices for rotating either screw shaft, and a clutch mechanism for adjusting said driving devices in operative connection with one of said screw shafts and disconnecting it from the other, whereby the partition in either compressed-air reservoir can be adjusted to maintain a uniform pressure in said reservoir, substantially as described.

2. The combination of two compressed air reservoirs each having arranged therein an adjustable partition, adjusting mechanism adapted to be operatively connected with or disconnected from either partition whereby the position of either partition can be varied to maintain a uniform pressure in either reservoir, an expanding chamber, and valved pipes that connect the compressed air reservoirs with said expanding chamber, substantially as described.

3. The combination of two compressed air reservoirs each provided with an adjustable partition, mechanism for adjusting the partition in either reservoir to vary the air space therein for the purpose of maintaining a uniform pressure in said reservoir as the compressed air is withdrawn therefrom, an expanding chamber, valved pipes through which compressed air is conducted from either compressed air reservoir to said expanding chamber, and an air engine communicating with said expanding chamber through a pipe provided with a throttle valve, substantially as described.

4. The combination of a compressed air reservoir provided with an adjustable partition whereby the air space of said reservoir can be gradually diminished for the purpose of maintaining a uniform pressure in said reservoir as the compressed air is withdrawn therefrom, an expanding chamber, a valved pipe through which compressed air is conducted from said reservoir to the expanding chamber, an automatic pressure regulating valve or governor located in said pipe to automatically maintain the desired pressure in the expanding chamber, and an air engine supplied with air from said expanding chamber through a pipe provided with a throttle valve, substantially as described.

5. In a compressed air car motor, the combination of two compressed air reservoirs each provided with an adjustable partition, means for adjusting the partition in either reservoir to vary the air space therein for the purpose of maintaining a uniform pressure in said reservoir as the air is withdrawn therefrom, an expanding chamber, valved pipes through which compressed air is conducted from either reservoir to said expanding chamber, an air engine communicating with the expanding chamber through a pipe provided with a throttle valve, means for connecting said engine with the running gear of the car, and an air brake mechanism supplied with power from the expanding chamber, substantially as described.

In testimony whereof I have hereunto set my hand and affixed my seal in presence of two subscribing witnesses.

JOSHUA KAMES. [L. S.]

Witnesses:
JAMES L. NORRIS,
J. A. RUTHERFORD.